United States Patent
Patil et al.

(10) Patent No.: US 10,949,557 B2
(45) Date of Patent: Mar. 16, 2021

(54) BLOCKCHAIN-BASED AUDITING, INSTANTIATION AND MAINTENANCE OF 5G NETWORK SLICES

(71) Applicant: Cisco Technology, Inc., San Jose, CA (US)

(72) Inventors: Prashanth Patil, San Jose, CA (US); Ram Mohan Ravindranath, Karnataka (IN); Nagendra Kumar Nainar, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 221 days.

(21) Appl. No.: 16/105,910

(22) Filed: Aug. 20, 2018

(65) Prior Publication Data

US 2020/0057860 A1 Feb. 20, 2020

(51) Int. Cl.
*G06F 21/62* (2013.01)
*H04W 84/04* (2009.01)
(Continued)

(52) U.S. Cl.
CPC ...... *G06F 21/6209* (2013.01); *H04L 63/1433* (2013.01); *G06F 21/602* (2013.01);
(Continued)

(58) Field of Classification Search
CPC ............ G06F 21/6209; H04L 63/1433; G06Q 20/401; H04W 84/042
See application file for complete search history.

(56) References Cited

U.S. PATENT DOCUMENTS 4,236,068 A 11/1980 Walton
5,642,303 A 6/1997 Small et al.
(Continued)

FOREIGN PATENT DOCUMENTS

JP WO 2018/111295 A1 * 6/2018 ............ H04L 29/06
WO WO 2013/020126 2/2013
(Continued)

OTHER PUBLICATIONS

"Cisco ASR 5x00 Mobility Management Entity Administration Guide," Version 15.0, Cisco Systems, Inc., Last updated Jun. 13, 2014, pp. 1-266.
(Continued)

*Primary Examiner* — Jason Chiang
(74) *Attorney, Agent, or Firm* — Polsinelli PC

(57) ABSTRACT

Disclosed herein is a distributed ledger method for a fifth-generation (5G) network. A network slice is created in the 5G network and a root block is generated in response, containing parameters of the network slice and contracts between participants in the network slice. A blockID of the root block is transmitted to identified participants in the network slice, who sequentially commit a plurality of new blocks to a blockchain beginning from the root block. The plurality of new blocks comprises auditing information of the network slice, wherein the information is collected by the participants in the network slice. The blockchain is stored in a blockchain network of a plurality of disparate blockchains. Desired auditing information for the network slice is retrieved by using the blockID of the root block to traverse the blockchain beginning at the root block until all blocks with the desired auditing information have been read.

20 Claims, 7 Drawing Sheets

(51) Int. Cl.
  *G06Q 20/40* (2012.01)
  *H04L 29/06* (2006.01)
  *G06F 21/60* (2013.01)
(52) U.S. Cl.
  CPC ... *G06F 2221/2101* (2013.01); *G06Q 20/401* (2013.01); *H04W 84/042* (2013.01)

(56) References Cited

U.S. PATENT DOCUMENTS

| | | | |
|---|---|---|---|
| 5,751,223 A | 5/1998 | Turner | |
| 6,812,824 B1 | 11/2004 | Goldinger et al. | |
| D552,603 S | 10/2007 | Tierney | |
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Toth et al. | |
| 8,396,485 B2 | 3/2013 | Grainger et al. | |
| 8,446,899 B2 | 5/2013 | Lei et al. | |
| 8,457,145 B2 | 6/2013 | Zimmerman et al. | |
| 8,458,184 B2 | 6/2013 | Dorogusker et al. | |
| D691,636 S | 10/2013 | Bunton | |
| 8,549,638 B2 | 10/2013 | Aziz | |
| 8,553,634 B2 | 10/2013 | Chun et al. | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,761,174 B2 | 6/2014 | Jing et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| 9,270,709 B2 | 2/2016 | Shatzkamer et al. | |
| 9,271,216 B2 | 2/2016 | Friman et al. | |
| 9,281,955 B2 | 3/2016 | Moreno et al. | |
| D757,424 S | 5/2016 | Phillips et al. | |
| D759,639 S | 6/2016 | Moon et al. | |
| 9,369,387 B2 | 6/2016 | Filsfils et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| 9,467,918 B1 | 10/2016 | Kwan | |
| D776,634 S | 1/2017 | Lee et al. | |
| 9,544,337 B2 | 1/2017 | Eswara et al. | |
| 9,569,771 B2 | 2/2017 | Lesavich et al. | |
| 9,609,504 B2 | 3/2017 | Karlqvist et al. | |
| 9,615,268 B2 | 4/2017 | Navarro et al. | |
| 9,634,952 B2 | 4/2017 | Gopinathan et al. | |
| 9,642,167 B1 | 5/2017 | Snyder et al. | |
| 9,654,344 B2 | 5/2017 | Chan et al. | |
| 9,712,444 B1 | 7/2017 | Bolshinsky et al. | |
| 9,713,114 B2 | 7/2017 | Yu | |
| 9,736,056 B2 | 8/2017 | Vasseur et al. | |
| 9,762,683 B2 | 9/2017 | Karampurwala et al. | |
| 9,772,927 B2 | 9/2017 | Gounares et al. | |
| 9,820,105 B2 | 11/2017 | Snyder et al. | |
| D804,450 S | 12/2017 | Spiel et al. | |
| 9,858,559 B2 | 1/2018 | Raleigh et al. | |
| 9,860,151 B2 | 1/2018 | Ganichev et al. | |
| 9,923,780 B2 | 3/2018 | Rao et al. | |
| 9,933,224 B2 | 4/2018 | Dorne et al. | |
| 9,961,560 B2 | 5/2018 | Farkas et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 9,998,368 B2 | 6/2018 | Chen et al. | |
| 10,121,025 B1 * | 11/2018 | Rice | H04L 9/30 |
| 10,299,128 B1 * | 5/2019 | Suthar | H04L 9/30 |
| 10,382,485 B2 * | 8/2019 | Won | H04L 9/3268 |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0031031 A1 | 1/2014 | Gauvreau et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | Keshava et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | Mubeesh et al. | |
| 2014/0191868 A1 | 7/2014 | Ortiz et al. | |
| 2014/0198808 A1 | 7/2014 | Zhou | |
| 2014/0222997 A1 | 8/2014 | Mermoud et al. | |

(56) References Cited

U.S. PATENT DOCUMENTS

| | | |
|---|---|---|
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0273083 A1 | 9/2017 | Chen et al. |
| 2017/0317997 A1 | 11/2017 | Smith et al. |
| 2017/0332421 A1 | 11/2017 | Sternberg et al. |
| 2017/0339706 A1 | 11/2017 | Andreoli-Fang et al. |
| 2018/0039667 A1* | 2/2018 | Pierce ............... G06F 16/2379 |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0150835 A1* | 5/2018 | Hunt ...................... H04L 67/10 |
| 2018/0158054 A1* | 6/2018 | Ardashev ............ G06Q 20/389 |
| 2018/0309567 A1* | 10/2018 | Wooden ................. H04L 63/12 |
| 2018/0349621 A1* | 12/2018 | Schvey ..................... G09C 1/00 |
| 2018/0349893 A1* | 12/2018 | Tsai ................... G06Q 20/3821 |
| 2019/0109717 A1* | 4/2019 | Reddy .................. H04L 9/0643 |
| 2019/0165930 A1* | 5/2019 | Castinado ............ H04L 63/123 |
| 2019/0205563 A1* | 7/2019 | Gonzales, Jr. ......... G06F 21/62 |
| 2019/0223089 A1* | 7/2019 | Salgueiro ............. H04W 48/14 |
| 2019/0306230 A1* | 10/2019 | Purushothaman ......................... H04W 12/0051 |
| 2019/0373472 A1* | 12/2019 | Smith ............... H04W 12/0802 |
| 2019/0379664 A1* | 12/2019 | Suthar .................... H04W 4/70 |
| 2019/0380030 A1* | 12/2019 | Suthar .................. H04L 63/102 |
| 2020/0059487 A1* | 2/2020 | Malik .................. H04L 9/0618 |
| 2020/0112543 A1* | 4/2020 | Weed ................. H04L 61/6027 |
| 2020/0137567 A1* | 4/2020 | Karapantelakis ... H04L 63/0876 |

FOREIGN PATENT DOCUMENTS

| | | |
|---|---|---|
| WO | WO 2014/098556 | 6/2014 |
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | 2018028777 A1 | 2/2018 |
| WO | WO 2018/053271 | 3/2018 |
| WO | 2018066362 A1 | 4/2018 |
| WO | WO 2018/111295 A1 | 6/2018 |
| WO | WO 2018/137699 A1 | 8/2018 |

OTHER PUBLICATIONS

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: Cisco Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to the University of Liverpool, Sep. 28, 2005, 116 pages.

Galvan T., Carlos E., et al., "Wifi bluetooth based combined positioning algorithm," International Meeting of Electrical Engineering Research Eniinvie 2012, Procedia Engineering 35 (2012), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

(56) References Cited

OTHER PUBLICATIONS

Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Leonhardt, Ulf, "Supporting Location-Awareness in Open Distributed Systems," May 1998, 186 pages.
Network Heresy, "NVGRE, VXLAN and What Microsoft is Doing Right," Oct. 3, 2011, 5 pages.
Norwegian National Security Authority, "N-03 Security guidance for switches and routers," Sep. 26, 2012, pp. 1-24.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Shwetha, D., et al., "A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE 3rd International Conference on Cloud Networking (Cloudnet), Oct., 2014, pp. 353-358.
Christidis et al., "Blockchains and Smart Contracts for the Internet of Things," IEEE Access, Special Section on the Plethora of Research in Internet of Things (IoT), vol. 4, May 10, 2016, pp. 1-12.
Morozov, Yury, " Blockchain Telecom: Bubbletone Blockchain," pp. 1-33.
"ROAUM: How to Unlbock Roaming Iot Using BLockchain," www. roaum.com, pp. 1-14.
International Search Report and Written Opinion from the International Searching Authority, dated Oct. 24, 2019, 14 pages, for corresponding International Patent Application No. PCT/US2019/046298.
Valtenen, Kristiina, et al., "Creating Value Through Blockchain Powered Resource Configurations: Analysis of 5G Network Slice Brokering Case," 2018 IEEE Wireless Communications and Networking Conference Workshops (WCNCW), Apr. 15, 2018, 6 pages.
Backman, Jere, et al., "Blockchain Network Slice Broker in 5G, Slice Leasing in Factory of the Future Use Case," 2017 Internet of Things Business Models, Users, and Networks, IEEE, Nov. 23, 2017, 8 pages.
Pavon, Ignacio Labrador, et al., "Project: H2020-ICT-2014-2 5G NORMA Project Name: 5G Novel Radio Multiservice adaptive network Architecture (5G NORMA)," Jan. 1, 2017, 158 pages.

* cited by examiner

US 10,949,557 B2

BLOCKCHAIN-BASED AUDITING, INSTANTIATION AND MAINTENANCE OF 5G NETWORK SLICES

TECHNICAL FIELD

The present technology pertains to 5G networks, and more specifically to maintaining auditing and monitoring information related to network slices in a 5G network.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks extend the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

However, there is little collaboration or information sharing in such network slicing scenarios, be it between the disparate actors associated with any given network slice or across multiple different network slices.

BRIEF DESCRIPTION OF THE DRAWINGS

In order to describe the manner in which the above recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
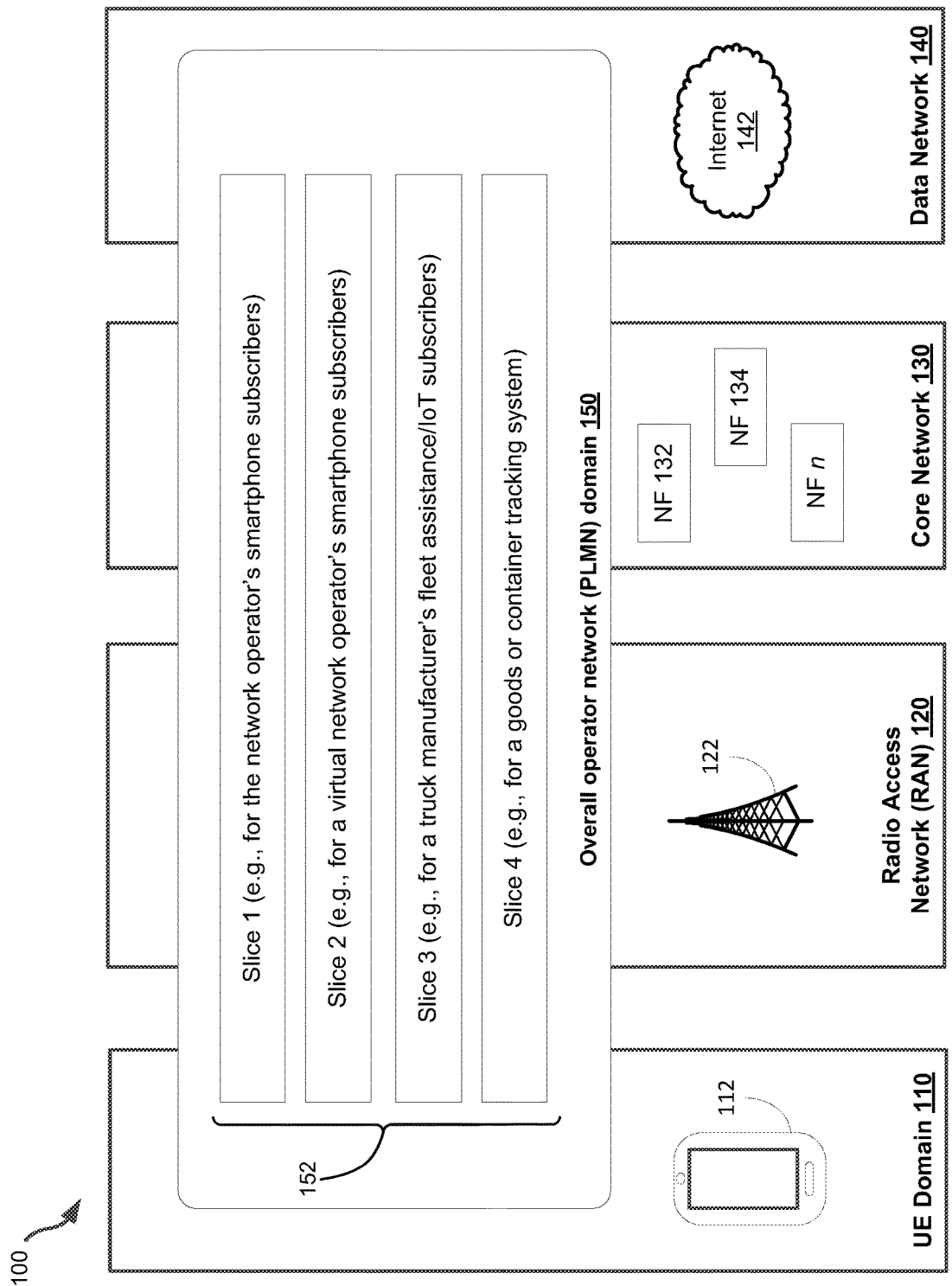
FIG. 1 illustrates an example 5G network environment with network slicing in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting the scope of the embodiments described herein. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are methods for a distributed ledger in a 5G network environment. When it is determined that a first network slice has been newly created in the 5G network environment, a first root block is generated corresponding to the first network slice. The first root block contains one or more parameters of the first network slice and also contains one or more contracts between at least two participants in the first network slice. A blockID of the first root block is transmitted to one or more identified participants in the first network slice. The one or more participants in the first network slice sequentially commit a plurality of new blocks to a first blockchain that begins from the first root block, wherein the plurality of new blocks comprise auditing information collected by the one or more participants in the first network slice. The first blockchain is stored in a blockchain network which comprises a plurality of disparate blockchains. Desired auditing information of the first network slice is later retrieved from the blockchain network by obtaining the blockID of the first root block corresponding to the first network slice and traversing the first blockchain from the first root block to obtain the desired auditing information.

Disclosed are computer-readable medium containing instructions stored therein which when executed cause at least on processor to perform operations implementing a distributed ledger in a 5G network environment. The processor determines that a first network slice has been newly created in the 5G network environment and subsequently generates a first root block corresponding to this first network slice. The processor generates the first root block to contain one or more parameters of the first network slice as well as one or more contracts between at least two participants in the first network slice. The processor transmits a blockID of the first root block to one or more identified participants in the first network slice, which commit a plurality of new blocks to a first blockchain that begins from the first root block. The processor causes the one or more identified participants to collect auditing information and store this auditing information within the plurality of new blocks. The processor causes the first blockchain to be stored in a blockchain network containing a plurality of disparate blockchains. Desired auditing information of the first network slice is later retrieved from the blockchain network by obtaining the blockID of the first root block corresponding to the first network slice and traversing the first blockchain from the first root block to obtain the desired auditing information.

Example Embodiments

FIG. 1 depicts an exemplary schematic representation of a 5G network environment 100 in which network slicing has been implemented, and in which one or more aspects of the present disclosure may operate. As illustrated, network environment 100 is divided into four domains, each of which will be explained in greater depth below; a User Equipment (UE) domain 110, in which a plurality of user cellphones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, . . . , n reside; and a Data Network 140, in which one or more data communication networks such as the Internet 142 reside.

Core Network 130 contains a plurality of Network Functions (NFs), shown here as NF 132, NF 134 . . . NF n. In some embodiments, core network 130 is a 5G core network (5GC) in accordance with one or more accepted 5GC architectures or designs. In some embodiments, core network 130 is an Evolved Packet Core (EPC) network, which combines aspects of the 5GC with existing 4G networks. Regardless of the particular design of core network 130, the plurality of NFs typically execute in a control plane of core network 130, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 130 can include one or more Access and Mobility Management Functions (AMF; typically used when core network 130 is a 5GC network) and Mobility Management Entities (MME; typically used when core network 130 is an EPC network), collectively referred to herein as an AMF/MME for purposes of simplicity and clarity. In some embodiments, an AMF/MME can be common to or otherwise shared by multiple slices of the plurality of network slices 152, and in some embodiments an AMF/MME can be unique to a single one of the plurality of network slices 152.

The same is true of the remaining NFs of core network 130, which can be shared amongst one or more network slices or provided as a unique instance specific to a single one of the plurality of network slices 152. In addition to NFs comprising an AMF/MME as discussed above, the plurality of NFs of the core network 130 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 100, an overall operator network domain 150 is defined. The operator network domain 150 is in some embodiments a Public Land Mobile Network (PLMN), and can be thought of as the carrier or business entity that provides cellular service to the end users in UE domain 110. Within the operator network domain 150, a plurality of network slices 152 are created, defined, or otherwise provisioned in order to deliver a desired set of defined features and functionalities for a certain use case or corresponding to other requirements or specifications. Note that network slicing for the plurality of network slices 152 is implemented in end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that these network slices 152 are provided for purposes of illustration, and in accordance with the present disclosure, and an operator network domain 150 can implement any number of network slices as needed, and can implement these network slices for purposes, use cases, or subsets of users and user equipment in addition to those listed above.

In order to provide tight coordination amongst the independent domains involved in network slicing (e.g., UE domain 110, RAN 120, core network 130, data network 140), and the various actors and operators within each domain, the present disclosure provides for a blockchain network with permission ledgers and smart contracts, where the blockchain network is provided for purposes of auditing, instantiation, and maintenance of a plurality of network slices across one or more different operator networks or PLMNs. In particular, disclosed are blockchains for network slice provisioning and utilization tracking, as well as purposes such as consistent session tracking, billing, and management, privacy and anonymization, QoS, etc.

Figure 2:
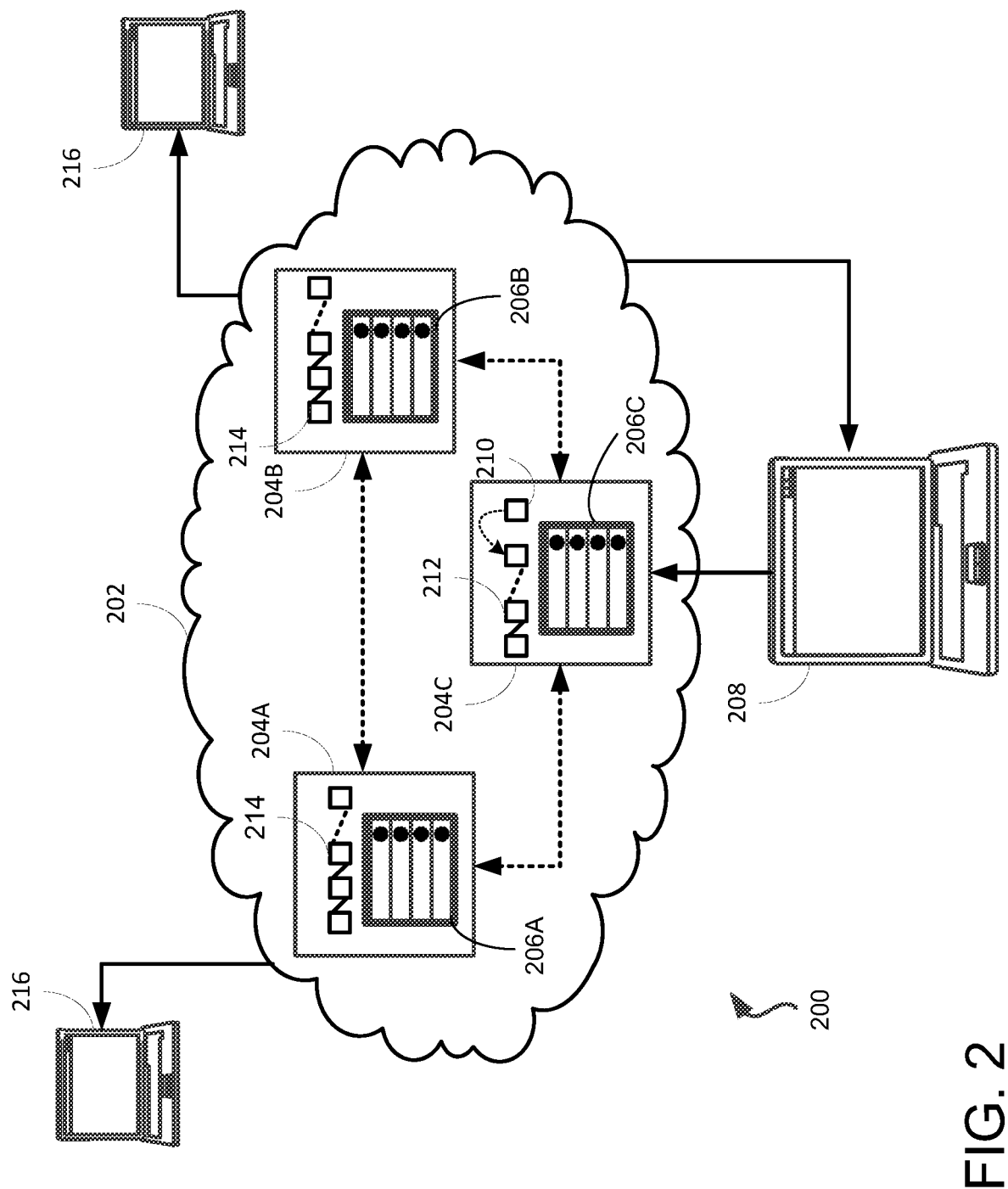
FIG. 2 illustrates an example blockchain network according to one or more aspects of the present disclosure.

With continued reference to FIG. 1, the disclosure turns now to FIG. 2, which shows an exemplary blockchain network environment 200 underlying the network slicing of FIG. 1. While FIG. 2 depicts one specific blockchain network environment 200 of the present disclosure, it is by no means the only blockchain network architecture on which the concepts herein can be implemented, as would be appreciated by one of ordinary skill in the art. Additionally, although blockchain network 200 is shown as comprising only a first blockchain, this is for purposes of clarity and it is appreciated that blockchain network 200 can comprise one or more additional blockchains without departing from the scope of the present disclosure. For example, as will be discussed in greater depth below, blockchain network 200 can comprise one blockchain for each network slice of the plurality of network slices 152 created in the operator network 150 of FIG. 1.

Returning to FIG. 2, as shown, blockchain network 202 includes blockchain nodes 204A-C, which implement and maintain one or more blockchains of the present disclosure. These one or more blockchains are accessed and/or written to by one or more terminals 208 and 216. It is appreciated that a greater or lesser number of blockchain nodes 204A-C and terminals 208, 216 can be provided as desired without departing from the scope of the present disclosure. Additionally, although the blockchain nodes 204A-C are shown as being implemented on corresponding servers 206A-C, one or more of the blockchain nodes 204A-C in some embodiments may instead or also be an executable software application on a server and/or personal computer, a virtual machine, and the like. In instances where multiple blockchains are provided, the same blockchain nodes (e.g., nodes 204A-C) may implement each blockchain, or different groupings and combinations of blockchain nodes can be utilized to implement different blockchains, without departing from the scope of the present disclosure.

Each blockchain node 204A-C may intercommunicate and store copies of blockchains and similar data objects in local memory and/or in a remote memory or a data store. In some embodiments, each node 204A-C may store copies of each blockchain on the blockchain network 202, and access the blockchain network 202 and respective blockchain on an as needed basis.

Terminals 208 and 216 interact with blockchain network 202 via, for example, the Internet or some other communication network, public or private, wired or wireless. For purposes of example, as shown in FIG. 2, terminal 208 may update one or more stored blockchains within blockchain network 202 by transmitting an event transmission, record object, or other signal to node 204C within blockchain network 202. Node 204C may then process the received transmission in order to generate a new block 210 which can be added onto a respective blockchain 212. In some examples, there may be processes for randomizing which node assumes authority to update the blockchain such as, for example, a mining algorithm and the like (e.g., solving an easily verifiable but difficult to solve cryptographic puzzle such as determining appended characters which will cause a hash value to have a particular quality). In other examples, certain or all nodes may be granted authority to update blockchains by the system and any updates produced are taken presumed authentic and authoritative.

Node 204C may then transmit an updated blockchain 214 to each other node 204A-B in blockchain network 202. Updated blockchain 214 may include previous blockchain 212 with the new block 210 appended. In this manner, updated blockchain 214 may reflect a sequential expansion of the associated blockchain and may replace previous copies (e.g., copies not including new block 210) stored on a given node.

In some embodiments, the functionality of the above described blockchain nodes 204A-C and terminals 208, 216 can be combined, such that a single computing entity, whether physical or virtual, both implements a blockchain in concert with other blockchain nodes while also reading from and writing to that blockchain as desired.

In the context of FIG. 1 and other 5G network environments of the present disclosure, it is contemplated that each of the four independent domains involved in network slicing (e.g., UE domain 110, RAN 120, core network 130, data network 140), as well as the various actors and operators within each domain, will comprise a terminal (such as terminals 208 and 216) for purposes of accessing and writing to one or more blockchains within blockchain network 202. As mentioned above, it is also possible that one or more of these domains and/or actors involved in network slicing may also implement blockchain node functionality in addition to actively reading and writing to the blockchain. In some embodiments, the blockchain network 202 (and the blockchain nodes 204A-C) may be implemented in a private fashion, e.g., consisting wholly or in majority of components associated with the 5G network environment, its domains and constituent actors. In some embodiments, the blockchain network 202 might be implemented in private fashion, but by a third-party external to the 5G network environment, such that the domains and constituent actors of the 5G network environment comprise only the access terminals 208, 216 for reading and writing to blockchains provided in a private blockchain cloud hosted by the external third-party. In some embodiments, the blockchain network 202 might be implemented as a public blockchain network, wherein one or more of the blockchain nodes 204A-C are not associated with a specific 5G network environment and are instead provided for example on the Internet.

In order to provide blockchain-based auditing, instantiation and maintenance of 5G network slices, a plurality of blockchains are implemented to provide a trusted permissioned ledger and repository of smart contracts. In some embodiments, one blockchain will be created for each network slice of a given network operator or network domain. For example, one blockchain would be created for each of the four network slices 152 of the overall operator network domain 150. In this manner, auditing and maintenance information otherwise independently collected and maintained by each domain or participant in the network slice is instead collated across domains/participants and stored in a corresponding blockchain for that network slice in a seamless and secure fashion, providing appropriately permissioned on-demand access to stored auditing information while simultaneously enforcing privacy, anonymization, and other contracts across the various participants in the network slice and blockchain.

The following discussion refers to an exemplary first blockchain created for a given first network slice, although the principles described below are applicable to various additional blockchains which may be created for each network slice of a 5G network environment. The first blockchain begins with a root block (also known as a genesis block), to which all subsequent blocks in the first blockchain are built upon and ultimately refer back to. One root block (and therefore one blockchain) can be created for each network slice of a 5G network environment. In some instances, a new root block will be created substantially simultaneous to the creation or instantiation of a new network slice in the 5G network environment.

Upon creation of the root block, a notification of the new root block and the new first blockchain is generated and transmitted only to the participants in the first network slice. In instances where new participants are added to the first network slice after the root block and first blockchain have already been created, a notification can also be transmitted to the new participants as a part of the process of adding the new participant to the first network slice. In some embodiments, the first blockchain can additionally be encrypted by default, and the requisite decryption information is transmitted only to the participants in the first network slice, either in the same notification of the new root block creation or in a separate, subsequent transmission. In some embodiments, upon creation of the new root block and first blockchain for the first network slice, all participants with which the first network slice has a service contract with will be notified of the new root block and first blockchain and requested to join. In some embodiments, one or more of the participants will be requested to or will elect to join the first blockchain as a blockchain node (e.g., the blockchain nodes 206A-C of FIG. 2). In some embodiments, participants initially joining the first blockchain will only be able to join as non-validating nodes, and will not be upgraded to the role of a validating node until recursively adding other nodes to the blockchain, e.g., such as in the scenario described above when a new participant joins the existing first network slice and must be added to the first blockchain.

Regardless of how it is created, the root block is permissioned to specify the read and write access capabilities to the first blockchain for each participant in the first network slice. This permissioning process can be augmented by defining various classes of auditing information that exist within the 5G network environment and the first network slice. For example, classes of auditing information can include billing information, resource utilization information, QoS information, call metrics information, logging information, etc.

Each participant, based on its role or involvement in the first network slice, will generate auditing information during the course of operating the first network slice and the 5G network environment. The generated auditing information from each participant will fall into one or more of the different classes of auditing information, which in some embodiments can be static or universal, and in some embodiments can be defined within the root block itself of the first blockchain, such that classes of auditing information can be defined on a slice-by-slice basis. The write permissions specified by the root block of the first blockchain can be active or passive: active write permissions require each participant in the first network slice to commit certain corresponding classes of auditing information to the first blockchain; passive write permissions impose no requirements but will prevent each participant in the first network slice from committing certain corresponding forbidden classes of auditing information to the first blockchain.

Read access and the read permissions specified by the root block of the first blockchain typically function in a passive manner, wherein different participants will have read access only to certain classes of auditing information. In a white-list model, a given participant can read blocks from the first blockchain only if the auditing information within the block is a permitted class for that participant. In a black-list model, a given participant can read any block from the first blockchain as long as the auditing information within the block is not a forbidden class for that participant. For example, the root block can be permissioned such that customer/subscriber participants in the first network slice (e.g., those located within UE domain 110 of FIG. 1) have read access to logging information blocks and resource utilization information blocks, but not billing information blocks. The root block can be further permissioned such that only network operators (e.g., within operator network/PLMN domain 150 of FIG. 1) have access to these sensitive billing information blocks. As another example, the root block can be permissioned such that technical support/engineers attempting to debug the first network slice and/or the 5G network environment only have access to logging information and resource utilization information blocks within the first blockchain, but no other classes containing sensitive information or information not consider private or not relevant. In this manner, the permissioning of the root block provides reassurance that each participant in the first network slice, and therefore participant in the first blockchain, has access only to authorized blocks or portions of the first blockchain.

Additionally, the use of different classes of auditing information allows for easy traversal and retrieval of interesting auditing information, for example by traversing the first blockchain based on a stored tag or other flag associated with each block in order to immediately indicate the class of auditing information contained within the block. In some embodiments, blocks containing a given class of auditing information can be encrypted, e.g., with an asymmetric key pair, such that only those participants who are authorized by the root block permissions to read or write that given class of auditing information are able to do so.

Logging information can be utilized to ensure that any policies as required by a given tenant on a network slice are correctly implemented and enforced. In some embodiments, one or more of these policies may be stored in the root block of the blockchain associated with the network slice. As a particular example, consider a policy requiring identity anonymization—the proper application and enforcement of such a policy can be particularly important when a UE is roaming and using a different network slice on a guest 5G network or PLMN. When policy application and enforcement information is included within the logging information, the UE is able to traverse the blockchain associated with the roaming network slice on the guest 5G network and audit this logging information to ensure that the UE identity is anonymized in the guest 5G network logs.

The root block for the first blockchain can contain permission information directly, such that all requests received from participants in the first network slice to read and write to the first blockchain are first checked against the permission information contained with the root block. In some embodiments, the permission information can be implemented indirectly, for example by utilizing the blockchain nodes 206A-C (which implement the first blockchain and other network slice blockchains contained within the blockchain network 202) to implement the desired read/write control.

In addition to the permissions information, the root block of the first blockchain can additionally contain or otherwise define one or more smart contracts defining rules for value-added services implemented within the first network slice between two or more of the participants. These smart contracts can be defined or otherwise received during the creation of the first network slice, at which point in time they can be written to the root block. During operation of the first network slice, the root block can be referenced to obtain and enforce these smart contracts. If additional smart contracts are defined after the creation of the root block and the first blockchain, then a new, updated block can be written containing a listing of all currently extant smart contracts, such that the updated block of smart contracts is subsequently referenced in lieu of the root block.

As mentioned previously, smart contracts can govern services such as privacy and anonymization, sharing identity information, and QoS. Additionally, smart contracts can define rules for one or more value-added services such as: SLAs (Service Level Agreements) and terms of privacy/anonymization within the first network slice (which can be for a set of users or for all users); security functions to be applied to the first network slice; encryption functions and rules for data within the first network slice (resting or moving), and so on. Based on these smart contracts, which are stored in either the root block of the first blockchain or stored in a new, updated smart contract block written to the first blockchain, all participants in the value added service within the first network will be required to execute the smart contract at the beginning and end of the service to thereby guarantee the request described in the smart contract.

Figure 3:
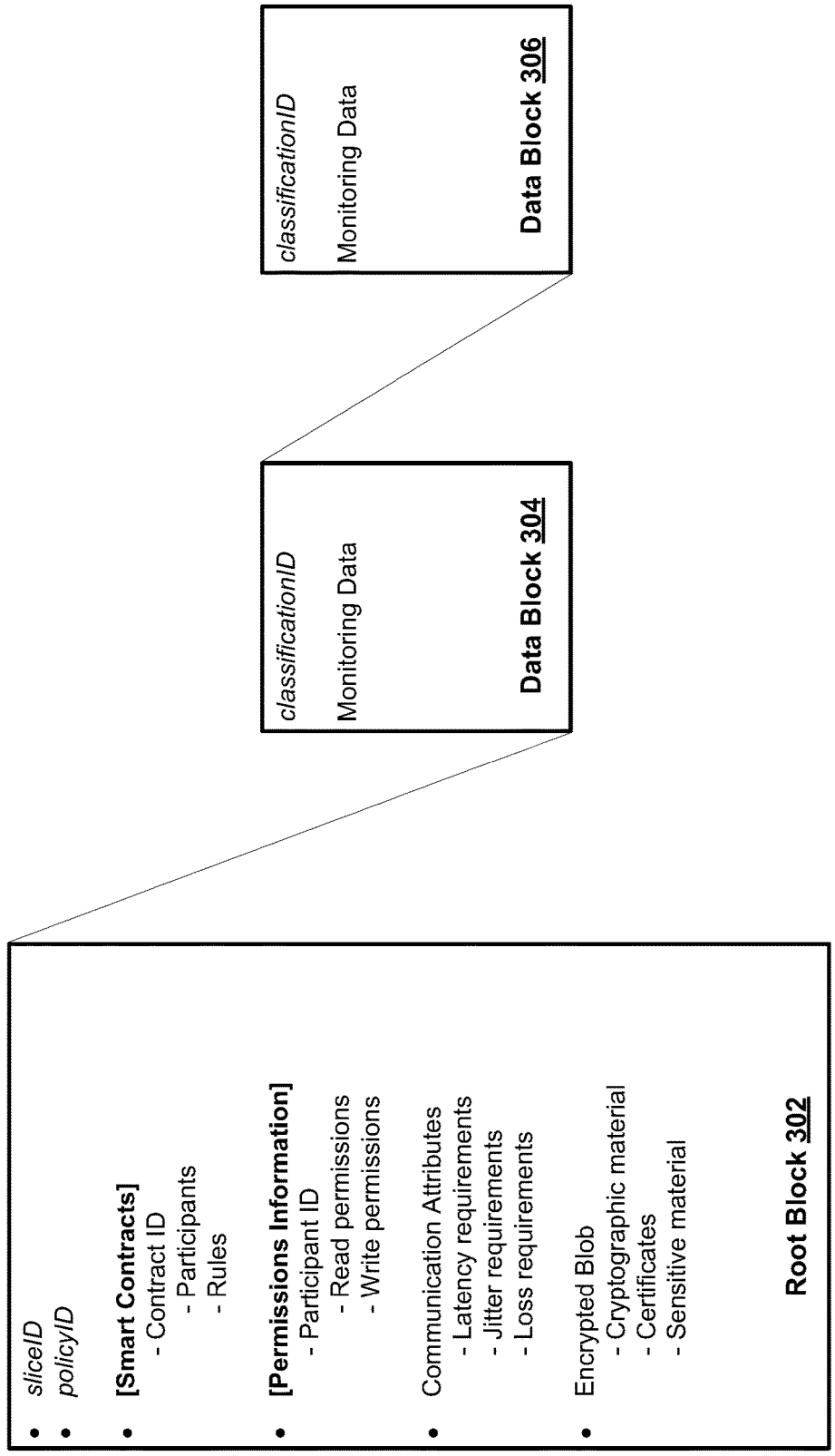
FIG. 3 illustrates an example root block and data blocks of a blockchain of the present disclosure.

FIG. 3 depicts a portion of an example blockchain 300 according to one or more aspects of the present disclosure. Blockchain 300 begins with a root block 302, which corresponds to a single network slice in a 5G network environment, as described above. Root block 302 comprises a sliceID, which uniquely identifies the network slice to which it corresponds. Additionally, sliceID can also uniquely identify the 5G provider space of the network slice. In some embodiments, the sliceID can be utilized to easily locate root block 302, and therefore the blockchain 300 stemming from root block 302, in instances where multiple blockchains are stored in a single blockchain environment, such as blockchain environment 202 of FIG. 2. Depending on how blockchain 300 is to be indexed by the participants of the network slice, a different slice identifier than the sliceID can be utilized. For example, if a tenant or subscriber in the 5G network environment only has a single slice (e.g. the virtual network operator of FIG. 1 which only has Slice 2), then a tenant/subscriberID could be used in root block 302. A tenantID uniquely identifies a subscriber of a network slice, e.g. multiple tenantIDs could be associated with a given sliceID. A given tenant can have multiple slices with the same 5G service provider and/or can have multiple slices across various different 5G service providers. Regardless of how the tenant's various slices are distributed, its tenantID will remain the same—it is the {tenantID, sliceID} tuple that will be a unique value representing the particular combination of a tenant and a network slice/5G service provider. In some embodiments, the slice identifier contained within root block 302 could be a trackingID/USMI (Universal Subscriber Mobile Identification Number) or could be an NSI (Network Slice Instance).

Root block 302 also contains a policyID, which in some embodiments is an identifier that provides a mapping between, on a first end, different communication attributes (such as latency/jitter/loss requirements) agreed upon between a subscriber and the 5G network provider, and on a second end, a smart contract. As shown in FIG. 3, root block 302 can additionally be created to contain these different communication attributes and the listing of smart contracts. Smart contracts or "autonomous agents" are computer programs that define rules for agreements/contracts or transactions, and include code for enforcing such rules. The smart contracts can automatically verify, execute and/or enforce a contract/agreement based on the terms or rules written in the code. Smart contracts can be partially or fully self-executing and self-enforcing.

As shown, each smart contract can be identified by a contractID, such that each contractID indexes the participants in a given contract and the rules stipulated by the given contract which must be followed by the participants. Although not shown, the communication attributes can further include, without limitation, other attributes such as caller; callee; types of supported flows in the network slice such as audio, video, IoT data, etc; and various other attributes as would be appreciated by one of ordinary skill in the art.

Root block 302 further contains a listing of permissions information, which in some embodiments can be similar to or substantially identical to the permissions information described previously. For example, the listing of permissions information can specify read and write permissions to the blockchain 300 for each one of the participants in the associated network slice. As illustrated, each one of these participants in the network slice can be identified by a participantID upon which the listing of permissions information is indexed.

Finally, root block 302 is also shown as containing an encrypted blob, which can comprise cryptographic material, certificates, and other sensitive material used by participants in the network slice. The encrypted blob is encrypted such that its relevant contents are accessible only to the corresponding participants executing each smart contract. For example, the core network domain 130 of FIG. 1 may be able to access within the encrypted blob sensitive subscriber information required for the core network 130 to trigger value added services such as video ads targeted to specific demographic and analytic information of each subscriber.

The creation of root block 302 is advertised to all participating entities of the network slice within the blockchain network. Each subscriber/customer managed service provider is also notified of the creation of root block 302 such that a corresponding administrator can access blockchain 300 when required. In some embodiments, permission could instead be granted at a later time only when it is actually needed.

Subsequently, every block that is committed to blockchain 300 is broadcast to all participating elements for consensus and updating of the distributed ledger. For example, data blocks 304 and 306 are committed to blockchain 300, as shown in FIG. 3. These data blocks each have a classificationID which indicates the specific class of monitoring data/monitoring information that is stored within the block. As discussed previously, this classificationID provides a basis upon which to implement the read/write permissions contained within the permissions information of root block 302, as well as a convenient and efficient basis for blockchain 300 to be traversed, beginning at root block 302, to obtain desired auditing information of certain classes. Each participant continues to commits certain data blocks to the end of blockchain 300, where the data block contains auditing information relevant to its participation in the flow of the network slice.

Figure 4:
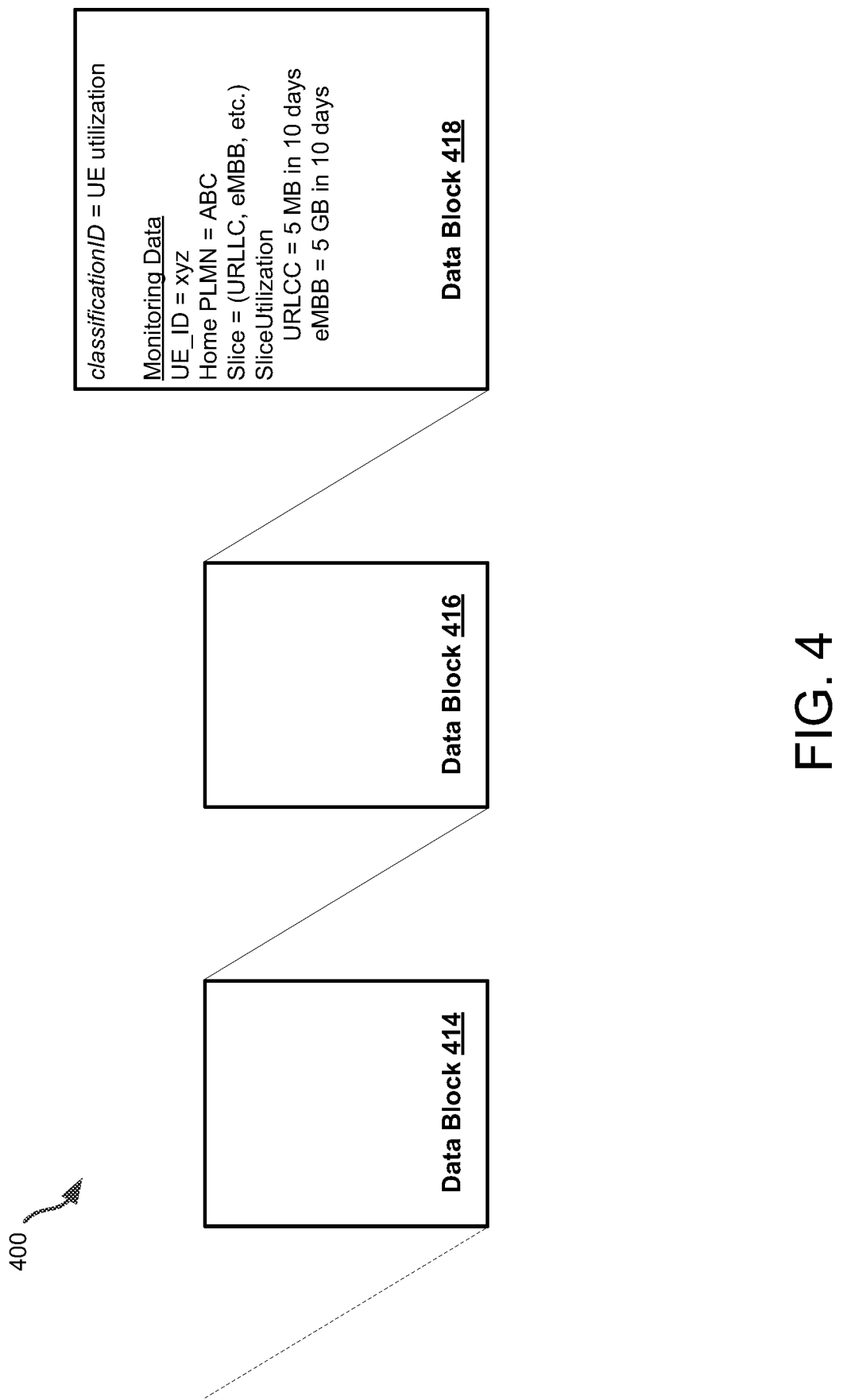
FIG. 4 illustrates an example User Equipment (UE) utilization block of a blockchain of the present disclosure.

As a particular example, consider a monitoring information classification category (i.e. a classificationID) which maintains network slice utilization information for a given UE (User Equipment), an example of which is shown in FIG. 4 as data block 418 of a blockchain 418. Note that the dotted line emanating from the left-hand side of data block 414 indicates that only a portion of blockchain 400 is shown, such that the root block and data blocks added prior to data block 414 are not seen.

Within the UE utilization classification category of monitoring information, the monitoring data or monitoring payload comprises a UE_ID indicating the particular UE for which the utilization information was collected, a Home PLMN of the UE, slice information associated with the UE, and slice utilization in the form of different types of data consumption by the UE over some prior period of time. This slice utilization information by the UE can be particularly helpful when the UE transmits a registration request to a PLMN, as the utilization information greatly assists the PLMN in determining whether the UE should be assigned to an existing network slice (i.e. when the UE has a low utilization) or whether a new network slice should be instantiated for the UE to be assigned to (i.e. when the UE has a high utilization). Therefore, by logging this utilization information within the blockchain on a UE-by-UE basis, network slice instantiation and assignment can advantageously be performed much more efficiently when the UE roams from its home PLMN to a visited PLMN. Currently, Network Slice Selection Assistance Information (NSSAI) is generated by the UE and transmitted as a part of the UE's request to join a PLMN, e.g. when roaming or migrating from a home PLMN to a visited PLMN or vice versa. However, this NSSAI does not provide any utilization history that would be helpful in performing capacity planning at the PLMN the UE is requesting to join. Accordingly, a UE utilization block such as data block 418 can be written to the blockchain every time that a given UE registers with a PLMN, whether the UE is registering with a new PLMN for the first time or if the UE returning to a PLMN where it had previously been registered before roaming away.

In some embodiments, it is contemplated that this registration process, and therefore the process of reading and writing the currently described UE utilization blocks, will be performed by an AMF/MME, recalling that an AMF is most typically used in a 5G core (5GC) network and an MME is most typically used in an Extended Packet Core (EPC) network, although the term AMF/MME is used to interchangeably refer to either, both, or some combination of these entities. In some embodiments, rather than using the AMF/MME to communicate with the blockchain of the present disclosure in order to read and write UE utilization blocks, it is contemplated that a specifically created new vNF (virtual Network Function), leveraging micro service architecture, can be provided, particularly at larger scales. In some embodiments, the UE itself or some combination of other core network elements can perform this process of reading and writing UE utilization blocks to the blockchain of the present disclosure.

Figure 5:
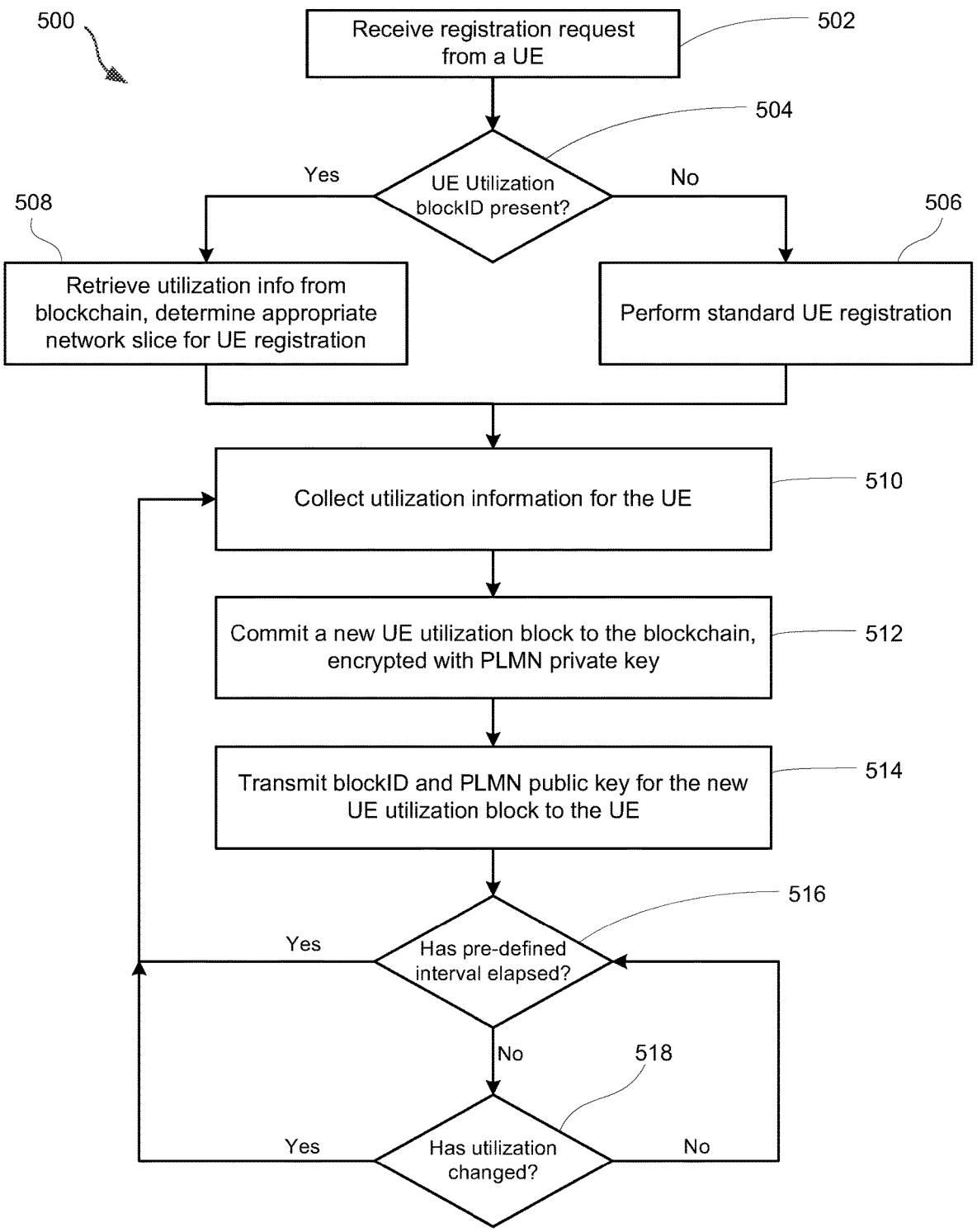
FIG. 5 illustrates an example method for creating and updating UE utilization blocks according to one or more aspects of the present disclosure.

FIG. 5 shows an example method 500 by which data blocks with a classificationID corresponding to UE utilization information can be utilized to streamline UE registration and network slice instantiation and assignment across one or more PLMNs. Reference is made below to the PLMN entity, but it is appreciated that this includes an AME and/or MMF of the PLMN, as has been discussed previously.

In a first step 502, a UE transmits a registration request to a PLMN, which may either be a home PLMN with which the UE is registering for the first time, or a visited PLMN that is distinct from a home PLMN of the UE. In this registration request, the UE will request relevant services from the PLMN/5G network in a conventional manner.

However, according to aspects of the present disclosure, the registration request may also contain UE utilization information, or more particularly, a reference to a blockID in the blockchain where relevant UE utilization information is located. In a decision step 504, the UE registration request is checked for the presence of any such indication.

If no UE utilization information or blockID is present in the registration request, then this means that the UE has likely never registered with a PLMN before. The method proceeds to a step 506, where the UE is registered with the PLMN in a conventional manner, i.e. by using NSSAI. Unless the UE indicates that it already has a home PLMN, this registration process will designate the current PLMN as the home PLMN for the UE.

However, if it is determined that UE utilization information is present in the registration request, e.g., in the form of a blockID pointing to a relevant block in the blockchain where the UE utilization information may be retrieved, then the method proceeds to a step 508. Using the blockID extracted from the registration request, the corresponding block is retrieved from the blockchain. In some embodiments, the corresponding block might be encrypted, in which case the registration request will contain a key or other cryptographic information needed to decrypt the block. If this is the case, the key or cryptographic information is also extracted and the corresponding block is decrypted. Within the decrypted block is the utilization information for the UE. In some embodiments, the contents of the decrypted block can be similar or identical to those presented in data block 418 of FIG. 4. Using this utilization information, the PLMN determines an appropriate network slice to assign the UE to. If the utilization information indicates low utilization, the UE may be assigned to an existing network slice. If the utilization information indicates high utilization, the UE may be assigned to a newly instantiated network slice.

In a step 510, utilization information is collected, where the utilization information corresponds to the UE. In some embodiments, utilization information might continuously or periodically be collected, either as a foreground or background process executing within the PLMN, an AMF/MME, or dedicated vNF, etc., as has been discussed previously. In this case, step 510 is a step where this continuously collected utilization information is compiled into a format compatible with or suitable for saving in a UE utilization information block.

In a step 512, the collected utilization information for the UE is committed to the blockchain as a new UE utilization block, which is encrypted with the private key of the PLMN. In this manner, the UE utilization information will only be visible to an entity with the corresponding public key of the PLMN, and cannot be viewed by other entities that are traversing the blockchain or otherwise happen to access the encrypted UE utilization block. The UE utilization block may be similar or identical to the data block 418 seen in FIG. 4. Although the present example is given in the context of the UE utilization block being appended to one of the network slice specific blockchains discussed previously, it is also possible that the UE utilization block is appended to any other blockchain that is mutually accessible between different PLMNs, once again due to the safeguard offered by the asymmetric public/private key encryption.

In a step 514, the PLMN transmits the blockID of the newly committed UE utilization block to the UE. The PLMN additionally can transmit its corresponding PLMN public key that can be used to decrypt the contents of the UE utilization block (which was encrypted with the paired private key of the PLMN). The UE stores this information locally in a secure fashion, although it is noted that the UE can still function even if it loses access to one or more of the blockID and the public key required to decrypt the contents of the block—in this case, upon attempting to register with a PLMN, no UE utilization info would be included in the registration request, so the PLMN would proceed from decision step 504 to step 506, as described above, in order to re-initiate the process and generate a new UE utilization block for the UE.

In some embodiments, the UE can verify the received blockID and PLMN public key by accessing the block in the blockchain that is specified by the blockID, using the PLMN public key to decrypt the contents of the block, and then validating that the UE_ID contained within the block matches its own UE ID. If there is not a match, then the UE can ignore the received data (because it is either fraudulent or erroneous), or can signal back to the PLMN that validation of the blockID and PLMN public key failed.

Next, the method proceeds to a decision step 516, which checks to see if a pre-defined update interval has elapsed. If the update interval has elapsed, then the method returns to step 510 and begins collecting utilization information for the UE, which will ultimately be committed to the blockchain as a new, most recent UE utilization block. While the prior UE utilization blocks will still be present in the blockchain, they are relevant only for historical or logging purposes, as any relevant or desired carryover information can be encoded in the new, updated UE utilization block.

If the update interval has not yet elapsed, then the method proceeds to a decision step 518, which checks if utilization information for the UE has changed to a degree that exceeds some pre-determined threshold. If it is determined that this is the case, then the method returns to step 510, where the changed utilization information for the UE is compiled and subsequently written to the blockchain as a new, most recent UE utilization block, as described above with respect to decision step 516. If utilization information for the UE has not changed to a sufficient degree to exceed a pre-determined threshold, then the method returns to decision step 516, at which point the method will alternate between checking for the update interval to elapse or a significant utilization change to occur until one of these conditions finally triggers an updated UE utilization block to be compiled and written to the blockchain.

In this manner, UE utilization information is continually assessed and committed to the blockchain when updates are necessary, based on a temporal basis or a magnitude of change basis. Accordingly, the most recent UE utilization block in the blockchain should contain relevant and current utilization information of the UE that can be utilized by a PLMN that the UE is registering with.

When registering with a PLMN, i.e. when roaming away from its home PLMN and to a visited PLMN, the UE will transmit a registration request that includes the blockID and public key that were more recently received and stored by the UE. The PLMN (or AMF/MME of the PLMN) can verify the blockID and public key by retrieving the block specified by the blockID, attempting to decrypt it with the public key, and validating the UE_ID contained within the decrypted block with the UE ID of the registering UE. If any of these steps fail, then the PLMN can treat the UE's registration request as a traditional registration request (which does not make use of utilization information), or may mark the registering UE as a fraudulent or malicious UE. Note that the above described process corresponds to step 508 and the 'yes' branch of decision step 504 of method 500.

If none of the validating steps fail, then validation has been successful and the PLMN has access to the UE policy information and/or the UE utilization information and history that are contained in the decrypted contents of the block specified by the blockID. Using this information, the PLMN performs optimized capacity planning and slice/policy instantiation that are based on the prior history, demands, and usage of the UE. For example, with reference again to the UE Utilization information block 418 of FIG. 4, the visited PLMN might receive a registration request from a UE that has roamed away from its home PLMN and is requesting URLLC and eMBB slices. From the UE utilization information block 418, the visited PLMN determines that, in its home PLMN, the UE had heavy utilization on eMBB and very little utilization on URLLC. Therefore, the PLMN may decide to re-use an existing URLLC slice for the UE while creating or instantiating a new eMBB slice for the UE. Once the UE has been registered onto these slices, the visited PLMN will perform utilization monitoring and will continue to commit updated UE utilization information blocks to the blockchain so long as the UE remains in the visited PLMN.

If the UE returns to its home PLMN, then its registration request to the home PLMN will include the most recently committed utilization information block created by the visited PLMN, which therefore contains the most recent utilization information of the UE within the visited PLMN. The home PLMN is therefore able to optimally assign the UE to one or more network slices upon its return, based on the most recent utilization characteristics of the UE within the visited PLMN, rather than the out-of-date utilization characteristics of the UE within the home PLMN before it roamed away to the visited PLMN.

In some embodiments, the data included in a UE utilization block, such as block 418 of FIG. 4 or any other of the UE utilization blocks described above, can also carry additional smart contract details that can be used by a visited PLMN to execute that contract dynamically for the UE within its one or more network slices within the visited PLMN. In some embodiments, the UE utilization block can simply contain the smart contract(s) in their entirety. In some embodiments, the UE utilization block can contain a smart contract ID, which the visited PLMN can use as an index to look up and retrieve the smart contract from a database or data store where they are located. In some embodiments, the UE utilization block can contain one or more blockIDs indicating the block or blocks within a blockchain (either the same blockchain where the UE utilization block is stored, or a different blockchain) where the smart contract details can be retrieved by the visited PLMN and applied across the one or more network slices in which the UE participates.

Figure 6:
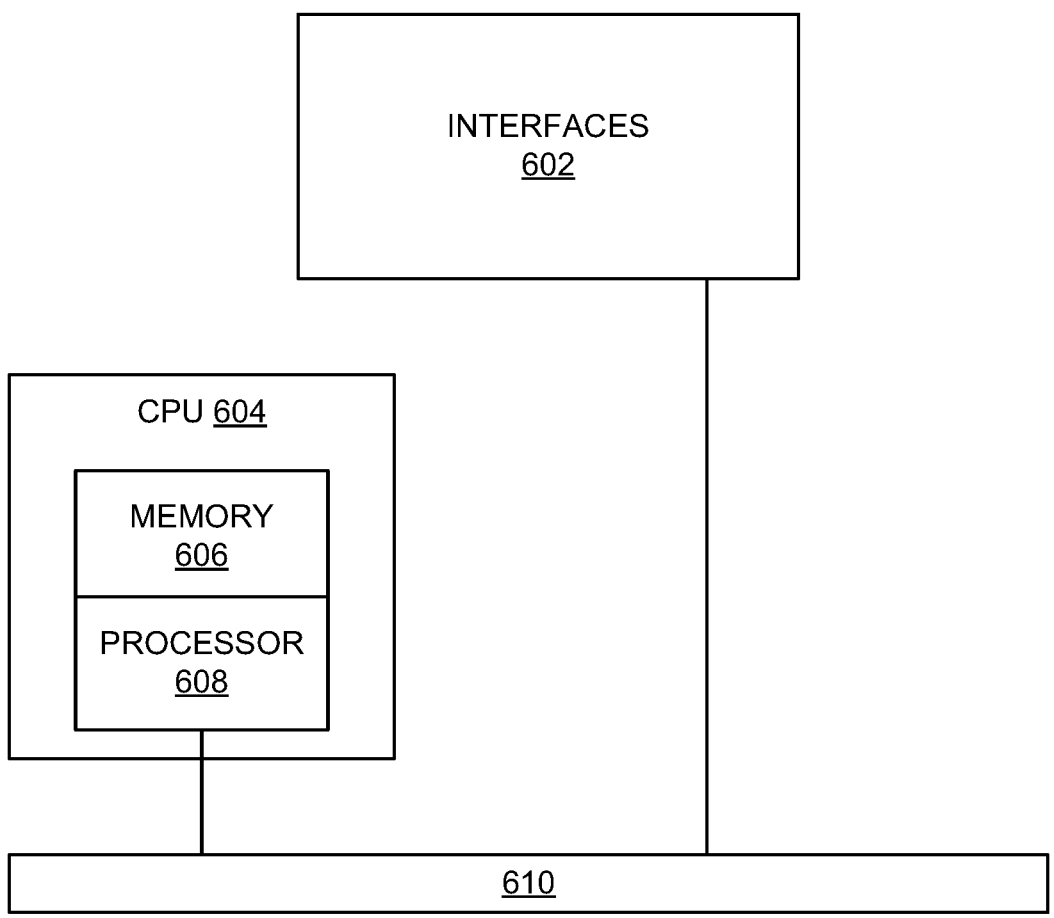
FIG. 6 illustrates an example network device upon which one or more aspects of the present disclosure may be provided.

FIG. 6 depicts an example network device upon which one or more aspects of the present disclosure can be implemented. Although the system shown in FIG. 6 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

Figure 7:
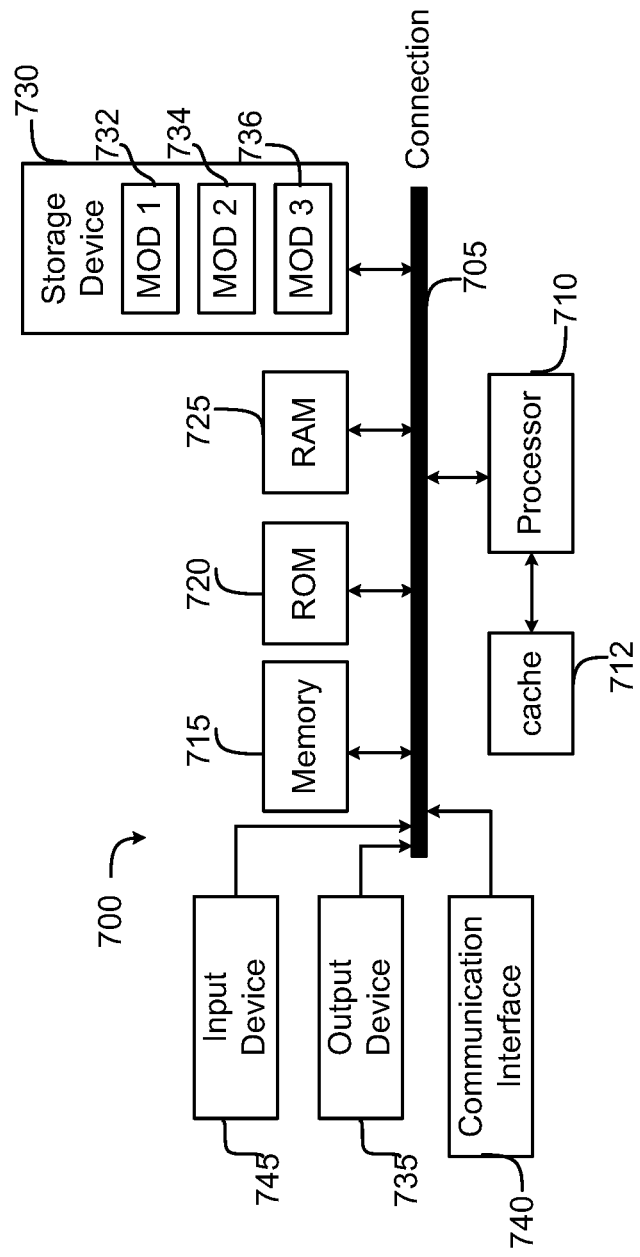
FIG. 7 illustrates an example computing system architecture upon which one or more aspects of the present disclosure may be provided.

FIG. 7 illustrates an example computing system architecture 700 including components in electrical communication with each other using a connection 705, such as a bus, upon which one or more aspects of the present disclosure can be implemented. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   determining that a first network slice has been newly created in a 5G network environment;
   identifying one or more participants in the first network slice;
   generating a first root block corresponding to the first network slice, the first root block containing one or more contracts and one or more policyIDs, each policyID specifying at least a loss requirements on the first network slice, and wherein each loss requirement is agreed upon between a subscriber and a 5G network provider in the first network slice by writing a contract into the first root block, the contract specifying at least the subscriber, the 5G network provider, and the agreed upon policyIDs;
   transmitting a blockID of the first root block to the one or more identified participants in the first network slice;
   sequentially committing, via one or more participants in the first network slice, a plurality of new blocks to a first blockchain beginning from the first root block, wherein the plurality of new blocks comprise auditing information collected by the one or more participants in the first network slice;
   storing the first blockchain in a blockchain network, the blockchain network comprising a plurality of disparate blockchains;
   retrieving, from the blockchain network, desired auditing information for the first network slice by obtaining the blockID of the first root block corresponding to the first network slice and traversing the first blockchain from the first root block to obtain the desired auditing information;
   identifying one or more new participants in the first network slice; and
   transmitting a notification to the one or more new participants, wherein the notification includes a request to join as a non-validating node in the first blockchain.

2. The method of claim 1, wherein the first root block further contains permissions information, the permissions information comprising read access permissions and write access permissions to the first blockchain for each of the identified participants in the first network slice.

3. The method of claim 2, further comprising classifying the auditing information contained within a given block of the first blockchain into a plurality of auditing information categories, such that the read access permissions and write access permissions for each of the identified participants in the first network slice are defined across the plurality of auditing information categories.

4. The method of claim 3, wherein the auditing information categories comprise one or more of billing information, resource utilization information, quality-of-service (QoS) information, call metrics information, and logging information.

5. The method of claim 3, wherein each new block committed to the first blockchain comprises an identifier of one or more auditing information categories of auditing information present within the new block.

6. The method of claim 1, further comprising:
   retrieving, via a control plane Network Function (NF) of the first network slice, one or more of the contracts contained within the first root block of the first blockchain;
   extracting one or more rules specified within each of the one or more contracts; and
   enforcing the one or more rules between the at least two participants in each of the one or more contracts.

7. The method of claim 6, wherein the one or more rules between the at least two participants in a contract are enforced in response to one or more of the at least two participants requesting read access or write access to the first blockchain.

8. The method of claim 1, wherein the one or more contracts between at least two participants in the first network slice specify one or more of value-added services, privacy and security terms, and quality of service (QoS) terms requested by a user or enterprise participant in the first network slice.

9. The method of claim 1, further comprising generating the first root block corresponding to the first network slice such that the first root block contains one or more of:
   a tenantID of a tenant of the first network slice;
   a service contract specifying at least one auditing information category that must be committed to the first blockchain by a given participant in the first network slice;
   a caller or callee in the first network slice; and
   a listing of types of supported data flows for the first network slice.

10. The method of claim 1, wherein the sliceID is associated with one or more tenantIDs.

11. The method of claim 1, wherein the 5G network environment comprises at least a user equipment (UE) domain, a radio access network (RAN) domain, a core network domain, and a data network domain, wherein the first network slice is created end-to-end such that it spans each of these domains.

12. The method of claim 1, wherein:
   the auditing information committed to the first blockchain comprises policy information and utilization history information of a first User Equipment (UE) operating in the first network slice; and
   the utilization history information is collected by an Access and Mobility Management Function (AMF) or a Mobility Management Entity (MME) associated with the first network slice.

13. The method of claim 12, wherein the policy information and utilization history information of the first UE is committed to the first blockchain as a UE utilization block, the UE utilization block comprising one or more of:
- a UE ID of the first UE;
- a home Public Land Mobile Network (PLMN) of the first UE;
- network slice instances associated with the first UE; and
- a bandwidth utilization history of the first UE within one or more of the network slice instances over a pre-defined period of time.

14. The method of claim 13, further comprising:
- encrypting the UE utilization block with a private key of an asymmetric key pair associated with the first network slice;
- transmitting a blockID of the UE utilization block to the first UE; and
- transmitting a public key of the same asymmetric key pair associated with the first network slice to the first UE, such that the UE can use the public key to decrypt one or more UE utilization blocks encrypted with the private key.

15. The method of claim 14, further comprising using the bandwidth utilization history of the first UE to perform network slice assignment and network slice instantiation at a visited PLMN of the first UE in response to the first UE roaming away from the home PLMN and transmitting a registration request to the visited PLMN.

16. The method of claim 15, wherein the registration request transmitted to the visited PLMN from the first UE includes the blockID of the UE utilization block and the public key for the UE utilization block.

17. The method of claim 16, further comprising verifying the registration request transmitted by the first UE by:
- retrieving the UE utilization block from the first blockchain, the UE utilization block identified by the blockID transmitted with the registration request;
- decrypting the retrieved UE utilization block using the public key transmitted with the registration request; and
- validating the UE ID contained within the decrypted retrieved UE utilization block against a UE ID associated with the transmitted registration request.

18. The method of claim 16, wherein access tokens are provided by an identity provider hosted by a separate network from the first endpoint and the second endpoint.

19. The method of claim 13, further comprising:
- determining that one or more of a pre-determined update interval has elapsed or a pre-determined threshold of change in a utilization level of the first UE has been exceeded;
- and compiling updated utilization history information of the first UE; and
- generating an updated UE utilization block based on at least the updated utilization history information of the first UE.

20. The method of claim 19, wherein the updated UE utilization block is generated such that it contains the updated utilization history information of the first UE and one or more unchanged portions of information previously contained in the UE utilization block.

* * * * *